United States Patent

[11] 3,614,062

| [72] | Inventor | Clarence O. Kuffer<br>Niles, Ill. |
|---|---|---|
| [21] | Appl. No. | 842,845 |
| [22] | Filed | July 18, 1969 |
| [45] | Patented | Oct. 19, 1971 |
| [73] | Assignee | Valve Corporation of America |

[54] AEROSOL VALVE
15 Claims, 7 Drawing Figs.

| [52] | U.S. Cl. | 251/354 |
|---|---|---|
| [51] | Int. Cl. | F16k 31/524 |
| [50] | Field of Search | 251/354, 353; 267/161, 164 |

[56] References Cited
UNITED STATES PATENTS

| 1,925,671 | 9/1933 | Mansfield | 267/161 |
|---|---|---|---|
| 3,060,965 | 10/1962 | Taggart | 251/354 X |
| 3,301,444 | 1/1967 | Wittke | 251/354 X |
| 3,416,770 | 12/1968 | Green | 251/354 X |
| 3,506,241 | 4/1970 | Ewald | 251/354 |

FOREIGN PATENTS

| 84,529 | 3/1957 | Netherlands | 267/161 |
|---|---|---|---|
| 1,475,831 | 2/1967 | France | 267/161 |

*Primary Examiner*—Samuel Scott
*Attorney*—Dressler, Goldsmith, Clement & Gordon ABSTRACT: An aerosol valve assembly including a valve member disposed within a chamber defined by a body, the body being in sealing engagement with a gasket. The valve member is normally biased into engagement with the gasket and has a stem extending through the gasket to define an outlet. The biasing means for maintaining the valve in its normally closed position is a generally flat spring element disposed and supported transversely in the shell and in expansive bearing contact with the lower end of the valve member.

INVENTOR
Clarence O. Kuffer
BY
ATTORNEYS 3,614,062

AEROSOL VALVE

BACKGROUND OF THE INVENTION

The present invention relates generally to improved aerosol valve constructions and more particularly to improved mechanism for maintaining a valve body in engagement with a sealing member.

For many years it has been standard practice in the construction of aerosol valves to provide biasing means in the form of a coil spring engaging a valve body to maintain the valve body in a normally closed position. Although there are exceptions to this, the vast majority of valves currently include such a coil spring. However, the use of coil springs greatly increases the part cost and assembly cost and presents problems inasmuch as a coil spring limits configuration of the valve shell and requires proper axial alignment of the valve body with the coil spring to insure a proper seal of the valve body in a closed condition. Also, the coil spring tends to tilt the valve body relative to the axis of the opening in the gasket through which the valve stem extends.

While alternatives for coil springs have been proposed, such as the mechanism disclosed in Graham U.S. PAT. NO. 3,344,961 and Green U.S. PAT. NO. 3,416,770, there still remains a need for a reliable, simple, efficient and less expensive manner of providing a biasing means for maintaining the valve body of an aerosol valve assembly in sealing engagement with the valve gasket.

SUMMARY OF THE INVENTION

The present invention provides an aerosol valve assembly having improved biasing means for maintaining the valve body of the valve assembly in sealing engagement with a sealing gasket of the valve assembly.

The improved biasing means is a transversely oriented sheet form biasing member within an axially extending body and which has elongated dimension substantially greater than the transverse dimension or thickness thereof. The biasing member has extended surface contact with an axially extending valve body to insure proper sealing of the valve body against a sealing disc. The biasing member is supported in the body in a manner to insure that the spring cannot be displaced sufficiently to cause permanent deformation.

The flat spring allows considerable reduction in the axial length of the shell and thereby reduces the volume of the expansion chamber defined by the shell.

Brief Description of Drawings

FIG. 4 is a horizontal sectional view taken generally along lines 4—4 of FIG. 2;

FIG. 5 is an enlarged fragmentary side elevational view of one of the elements forming the valve body of the present invention;

FIG. 6 is an end view of the valve element shown in FIG. 5; and

FIG. 7 is an exploded perspective view of the various parts forming the present invention.

DETAILED DESCRIPTION

Figure 1:
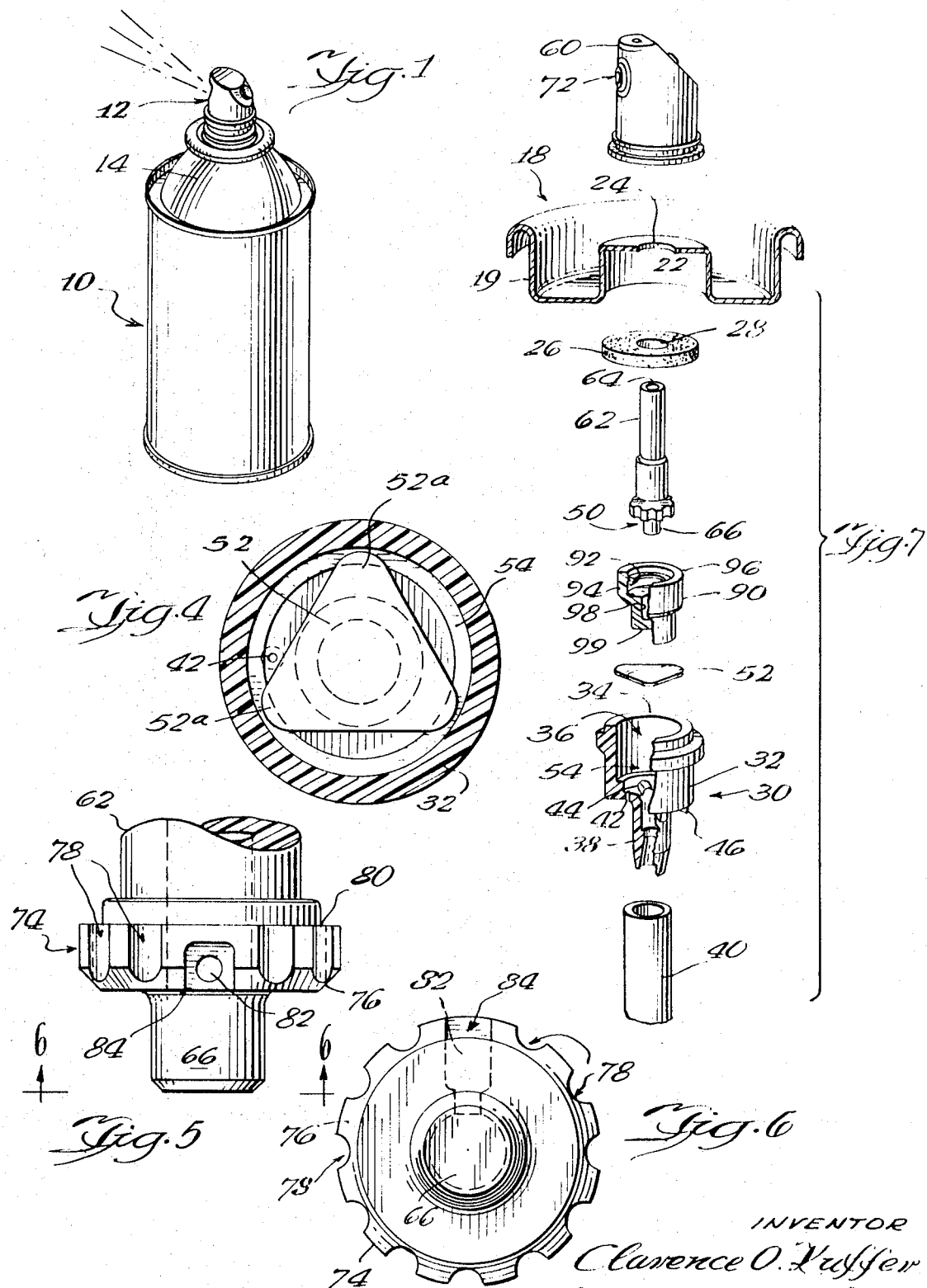
FIG. 1 is a perspective view of an aerosol container having the valve assembly of the present invention incorporated therein.

Referring now to FIG. 1 of the drawings, there is shown a container 10 provided with valve means 12. The container 10, which may be considered an aerosol can, has a domed top 14 formed with an opening defined by a ring 16 (FIG. 2) which has secured thereto a mounting cup 18 having a wall 19. Suitable sealing means 20 may be interposed between the mounting cup and the ring 16 so as to properly seal the contents of the can from the atmosphere. The mounting cup or cover 18 also has a central pedestal 22 centrally apertured at 24. In conventional constructions the space between the wall 19 and the container 10 is quite substantial so that a substantial volume of fluid may be retained therein when the container is to be emptied in an inverted position. The configuration of the present mounting cup, herein illustrated, considerably reduces the volume between the wall 19 and the upper end of the container thereby insuring that substantially all of the contents can be removed when the container is disposed in an inverted position and the valve means is actuated.

The valve means or assembly 12 includes a sealing disc or gasket 26 having an aperture 28 concentric with aperture 24 and of reduced size. The valve assembly further includes a valve body 30 having a vertically extending wall or flange 32, the upper end 34 of which is held in sealing engagement with the disc 26 by having the flange 32 crimped or otherwise fixedly secured within the pedestal 22. The wall 32 thus defines an enlarged sealed chamber 36 which has a depending tubular member 38 connected through a dip tube 40 to the bottom of the container. The chamber 36 may also be in communication with the upper portion of the container through a restricted opening 42 commonly referred to as the vapor phase tap.

The lower wall of the body has upwardly directed ribs 44 and downwardly directed ribs 46 which are aligned in vertical planes, for a purpose which will become apparent hereinafter.

According to a primary aspect of the present invention, a valve 50 is normally supported in sealing engagement with the valve disc 26 by biasing means which are supported within the body 30 and which engage a free end of the stem seat 90. The biasing means is in the form of an elongated sheet like member having a longitudinal dimension substantially greater than the transverse dimension thereof. Stated another way, the resilient member comprises a thin flat sheet or plate having a maximum transverse section many times greater than the thickness thereof.

In the illustrated embodiment and as more clearly shown in FIGS. 4 and 7, the biasing means includes a flat member or plate 52 supported on a ledge 54 defined within the valve body 30. As seen in FIG. 4, the homaloidal member 52 is symmetrical about the longitudinal axis of the shell and about its own vertical axis and is illustrated as being polygonal or triangular in configuration with apices 52a supported on a transversely oriented ledge or abutment 54. The flat sides of the triangular member or disc are spaced from the ledge and the apices 52a provide multipoint contact with the shell support means 54 and the flat sides provide communication between the depending tube or fluid inlet passage 38 and the chamber 36.

In coil springs, which are used in aerosol valve assemblies, the end of the spring that engages the valve body does not apply an equal engaging force to the entire contact area of the valve. Stated another way, the end of the coil is not in a plane which is normal to the axis of the spring. This results in torque on the valve body tending to tilt or cant the valve body from its truly upright position when the valve is in the closed position. Sometimes, this tilt or cant is sufficient to result in problems when actuators are subsequently applied to the valve stem. In fact, in some cases, this tilt or cant has resulted in destruction of the actuator or the valve during automatic assembly of actuators on the valve stem.

The flat spring overcomes this problem by applying forces that are parallel to the axis of the valve body and symmetrical about the axis so that the valve body will always return to its truly upright closed position after it has been tilted to an open position.

The symmetrical configuration of the spring insures that an equal and axially symmetrical force is applied to the entire peripheral portion of the lower end surface 99 of the valve stem seat 90 and, thereby, the same amount of force is required to tilt the valve to an open position regardless of direction of force applied to the actuator 60. Thus, the same force applied to any portion of the peripheral surface of the valve body, which extends beyond the container, will open the valve to the same open position.

The size and shape of the spring also produces a restriction at the level of the spring thereby creating two expansion chambers, one being below the spring and the other above the spring. This arrangement gives more uniform flow and exhaustion from a dispenser utilizing the flat spring. In a coil spring construction generally utilized, the depending tubular member or tailpiece 38 opens directly into the shell and may cause nonuniform flow.

The illustrated valve 50 is constructed of two parts which cooperate with each other to define a restricted flow path between the container and an actuator 60. Thus, the valve 50 (FIGS. 2 and 7) includes a valve stem 62 having an axially extending bore 64 closed at one end by a reduced area portion 66. The valve stem extends through the opening 28 in the gasket 26 and is in sealing engagement therewith while the upper end of the valve stem is received in a socket or bore 70 defined in the actuator 60. The upper free end of the bore 64 thus communicates with an outlet 72 defined on the actuator 60.

The lower end of the valve stem has an enlarged radially extending portion 74 (FIGS 5 and 6), the lower edge of which has a downwardly and inwardly inclined surface 76 and the peripheral surface of which has a plurality of axially extending passages 78 defined by grooves formed thereon. The lower end of the passages 78 merge with the inclined surface 76 and the upper ends merge with a flat horizontally disposed wall 80 defining the upper portion of the enlarged portion 74.

The valve stem or first valve element 62 further includes a transversely extending opening or orifice 82 communicating at its inner end with the lower end of the closed bore or opening 64 and at its outer end with an axially extending recess 84 defined on the peripheral surface of the enlarged portion 74 and circumferentially disposed between spaced axially extending passages 78. The lower end of the recess 82 merges with the inclined surface 76 while the upper end thereof terminates below the horizontal surface 80, for a purpose of which will become apparent hereinafter.

The valve 50 (FIGS. 2 and 3) further includes a second valve element or stem seat 90 having an enlarged socket 92 defined by a wall 94 terminating at its upper end in a ledge or rim 96. The stem seat or valve cup 90 further includes a reduced area recess or socket 98 and a horizontally disposed ledge 100 defined between the enlarged socket 92 and the reduced area recess or socket 98. The lower end of the cup 90 has a substantially flat surface 99. Adjacent the upper inner surface of the wall 94, the valve cup has an annular bead or inwardly extending flange 102, for a purpose which will become apparent hereinafter.

The valve parts including valve stem 62 and valve cup 90 are interconnected by axial insertion of the lower end of the valve stem into the valve cup. During this insertion, the reduced area portion 66 of the valve stem is received in the reduced recess or socket 98 and the enlarged portion 74 defined on the peripheral surface of the stem 62 is received in the enlarged socket 92. The diameter of the enlarged portion 74 is slightly greater than the space defined between adjacent surface or inner edge of the bead 102 so as to cause a deformation of the bead and some outward movement of the wall 94 during axial insertion of the valve stem into the cup. Upon complete insertion of the valve stem into the cup, the annular bead or flange 102 snaps inwardly above the enlarged portion 74 of the stem 62 and cooperates with the flat surface or wall 80 to securely interconnect the two elements.

Figure 2:
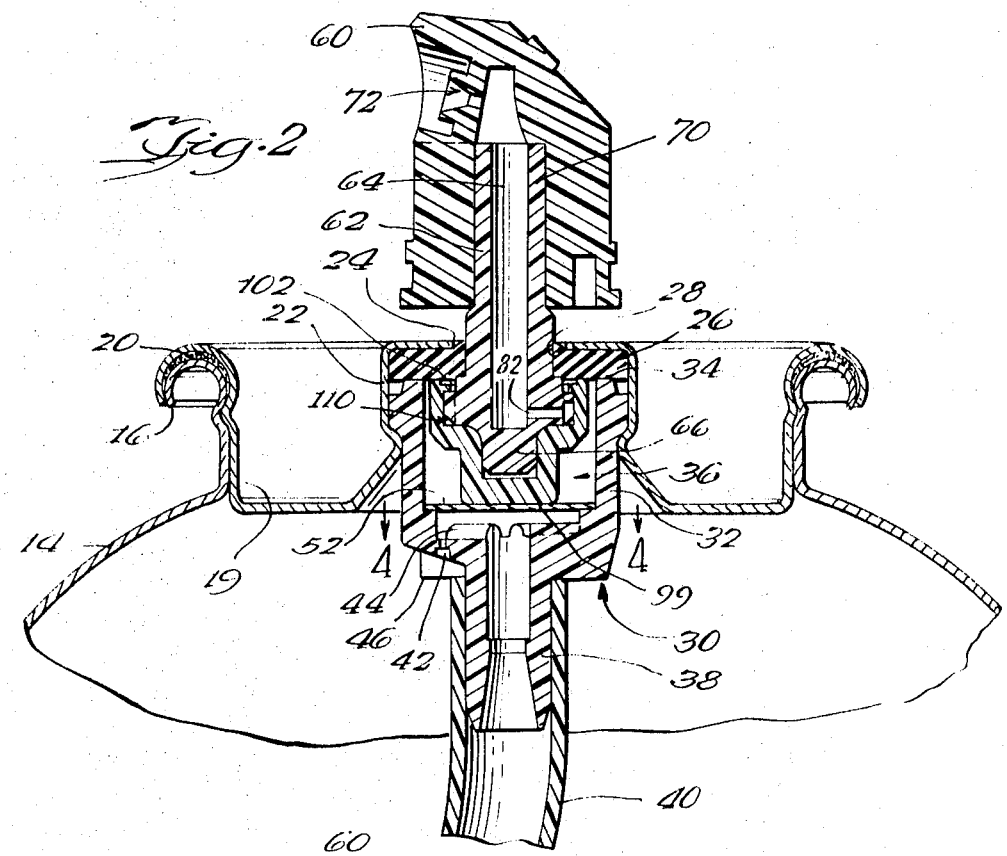
FIG. 2 is a vertical sectional view of the upper portion of the container shown in FIG. 1 and showing the various details of the valve assembly in its sealed position.
Figure 3:
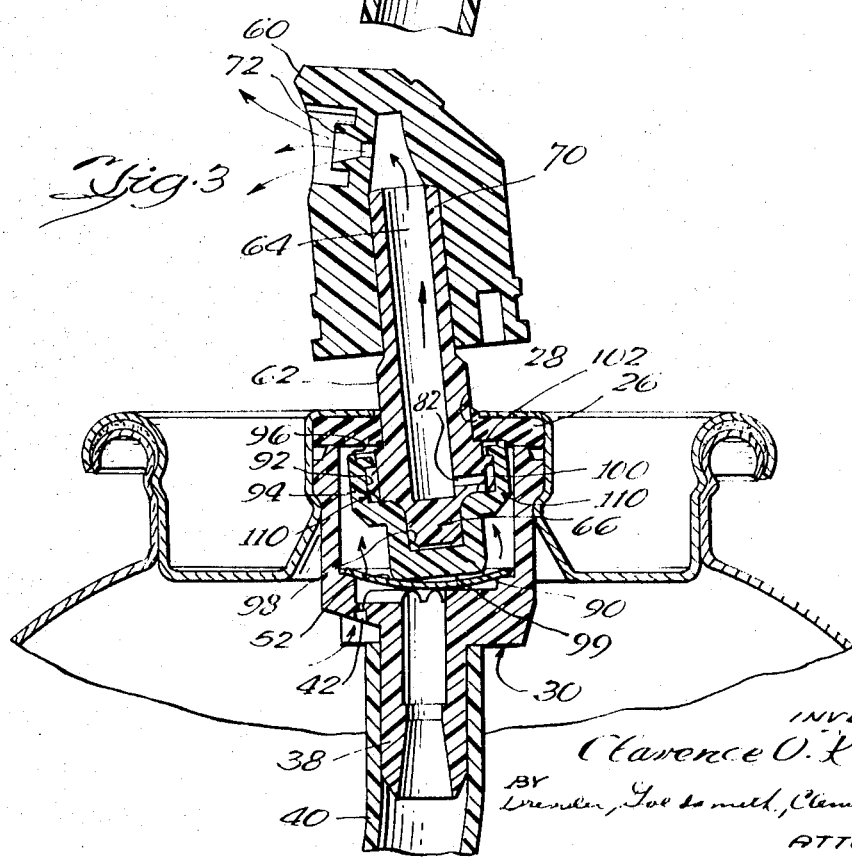
FIG. 3 is a view similar to FIG. 2 showing the valve body in position for dispensing fluid from the container.

As can be appreciated, once the two elements are interconnected in a manner shown in FIGS. 2 and 3, the reduced area stem 66 received in the reduced recess or socket 98 and the cooperation of the lower surface of the enlarged portions 74 with the ledge or horizontal wall 100, will insure that the relative position between the two elements remains fixed.

In the assembled condition of the valve parts 62 and 90, a discharge flow passage is provided between and through the respective elements by a cooperation of the elements. The flow passage for the valve commences between the upper edge of the rim 96 and the peripheral surface of the valve stem 62 and extends axially downwardly through the respective passages 78. The flow passage then continues annularly around the peripheral surface of the enlarged portion through an annular recess 110 defined by the inclined surface 76 and the peripheral surface of the socket 92. The flow passage continues upwardly through the recess 84 and thence transversely through the radial orifice 82 and upwardly through the bore 64 and finally through the discharge opening 72 in the actuator 60.

OPERATION

The unique cooperation between the biasing means or spring 52 and the valve 50 will now be described in conjunction with the operation of the valve assembly. In its assembled condition, the valve stem 62 extends axially through the opening 28 of the gasket 26 and is in sealing engagement therewith. The valve stem seat 90 has a portion which is axially oriented in the shell 30 and has a free end surface 99 spaced from the gasket 26. The rim 96 of the valve cup is normally held in engagement by the flat spring or symmetrical planar member 52 supported in the shell 30 and in extended engagement with the free end surface 99 of the portion of the valve stem seat within the shell. As can be seen from FIG. 2, the flat spring is slightly deformed but remains in expansive bearing contact with substantially the entire lower end surface 99 of the valve cup 90 so as to insure a proper sealing engagement of the entire peripheral rim of the cup with the gasket 26. The multipoint contact of the apices 52a which are equally spaced about the periphery of the spring 52 will produce an equal force to all portions of the surface 99 and will eliminate the tendency of the valve body to tilt as is the case when using a coil spring.

To actuate the valve, it is merely necessary for an operator to provide a downward or sideways force on the actuator 60 which will move or tilt the valve body 50 from the position shown in FIG. 2 to that shown in FIG. 3. This will flex the sheet form biasing member 52 and break the sealing engagement of the rim 96 along at least a portion of its peripheral area so as to provide communication between the interior of the container, the chamber 36 and the flow passage including axial grooves 78, annular recess 110, transverse orifice 82 and the axially extending bore 64.

In the actuated position, the flat further deformed spring will not only produce an axial force tending to close the valve but will also produce a rotational force or moment tending to return the valve body to its truly upright position. The combination of these two forces will insure that the valve body will always return to the upright or vertical position shown in FIG. 2.

It should be noted at this point that the ribs 44 and 46 cooperate to insure that the lower wall of the shell will not deform when extreme pressure is applied to the valve body 50 and the upper ribs 44 are disposed in the path of movement of the biasing member 52 and define means which will prevent excessive displacement of the flat spring 52 that could cause permanent deformation of the spring plate.

Also, the use of the flat spring member 52 makes it possible to considerably reduce the overall height of the valve shell thereby reducing the size of the expansion chamber 36. This reduction in expansion chamber size allows a reduction in the overall height of the mounting cup thereby considerably reducing the amount of product which cannot be discharged from a substantially empty container that is intended for operation in the inverted position. The reduction in volume of the expansion chamber also considerably reduces the time for equilibration of propellant with the concentrate when under-the-cap pressure filling is used. This insures that the initial discharge by the customer will have a proper mixture of propellant and product. In valve assemblies using coil springs equilibration normally takes about 30 days while in the flat spring assemblies equilibration takes only about 10 days.

The reduced volume of the shell, as well as the restrictions created by the flat spring, also has been found to substantially reduce "flutter," particularly when the container approaches an empty condition. In valves using coil springs, "flutter," inconsistent or pulsating flow, occurs as the can approaches an empty condition, apparently because of the volume of the chamber 36 and the direct communication of the tailpiece 38 with the chamber 36. The impervious spring 52 is in alignment with the intake passage defined by tubular member 38 to block axial flow from the passage directly to the chamber 38.

The advantages of the improved valve assembly are believed to be apparent from the above description. However, for purposes of completeness, some of the advantages of the improved valve assembly will be outlined.

The thin flat spring and the particular construction of the valve body allow increased surface contact between the valve body and the spring to assure a proper seal at any time the actuator is released. The particular valve spring, which may be formed of metal or a plastic having the inherent capability of returning to undeformed condition. The valve assembly of the present invention allows greater flexibility in construction of the shell. Also, it can be well appreciated, that the flat piece of material is inexpensive to construct and easy to install and that accurate coaxial alignment of the spring and valve stem seat, heretofore generally necessary, is no longer essential.

While the improved biasing means and valve stem seat have been shown in a single valve assembly, it is readily apparent that various other valve bodies may be utilized with the present biasing means. By way of example, the improved biasing means could readily be incorporated in valves of the types shown in U.S. Pat. Nos. 2,831,618; Re. 24,981; and 3,388,840.

The flat spring could have a variety of configurations such as a circular disc supported on circumferentially spaced projections extending inwardly from the shell wall 32 with the area between the projections, the wall and the outer edge of the disc providing the flow passage to chamber 36. Alternatively, the spring could be circular with circumferentially spaced cutouts and supported on the ledge 54 and the cutouts will then provide a flow passage.

What is claimed is:

1. In an aerosol valve assembly having an axially oriented tubular body defining a valve chamber, a valve means comprising a valve stem seat in said chamber, an axially oriented stem means associated with said valve stem seat, a transverse sealing gasket in sealing engagement with one end of said body, said sealing gasket having an opening with said stem means extending therethrough, and biasing means for normally maintaining said valve means in sealing engagement with said gasket; said biasing means comprising support means in said body, and a transversely oriented sheet form, flexible biasing member supported by said support means, said biasing member having extended engagement with an end portion of said valve stem seat which is spaced from and below said sealing gasket, said biasing member being flexed when said valve means is displaced to an operating position to provide a flow path from said chamber through said stem means, the extended engagement between the end portion of said valve stem seat and said biasing member, together with the engagement of said biasing member with said support, being the sole constraining and locating means for said biasing member.

2. An aerosol valve assembly as defined in claim 1, the further improvement of said biasing member comprising a thin plate supported in the bottom of said chamber. greater 3. An aerosol valve assembly as defined in claim 1, in which said biasing member has a first dimension extending transversely of the axis of said body and a second dimension extending axially of said body, said first dimension being many times greater than said second dimension.

4. An aerosol valve assembly as defined in claim 1, in which said biasing member has extended engagement with the lower free end of said valve stem seat, and said free end is adapted to slide transversely along said biasing member.

5. An aerosol valve assembly as defined in claim 1, in which said biasing member is symmetrical about the axis of said valve stem whereby to apply substantial equal pressure to all portions of said valve means which are in engagement with said gasket.

6. An aerosol valve assembly as defined in claim 1, in which said body includes a bottom wall spaced below said support means, the further improvement of means on said bottom wall limiting displacement of said sheet form, flexible biasing member whereby to prevent permanent deformation of said flexible biasing member.

7. An aerosol valve assembly as defined in claim 1, and wherein said support means comprises means defining an inwardly extending transversely oriented abutment with said biasing member having peripheral edge portions seated thereon, said biasing member being freely supported on said abutment.

8. An aerosol valve assembly as defined in claim 7 in which said biasing member comprises a generally triangular member having apices interconnected by flat sides with only said apices supported on said abutment, said edges being spaced from said abutment to provide said communication between said chamber and an inlet port defined on said body below said biasing member.

9. An aerosol valve assembly, characterized by the absence of a coil spring and centering means for the coil spring, comprising a mounting cup having a central aperture; sealing gasket means in said mounting cup and surrounding said aperture; and axially oriented tubular shell secured to said mounting cup around said aperture, said tubular shell sealingly engaging said gasket means around said aperture; an axially oriented valve member having at least a portion thereof inside said shell; and biasing means urging said valve member into sealing engagement with said gasket, said biasing means comprising support means in said shell and a transversely oriented expansive planar biasing member supported by said support means, said transversely oriented biasing member being in expansive bearing contact with said valve member portion; said support means positioning said biasing member to normally maintain said biasing member in a partially deformed condition and maintain said valve member in sealing engagement with said disc, said expansive bearing contact with said valve member portion, together with the engagement of said biasing member with said support means, being the sole constraining and locating means for said biasing member.

10 An aerosol valve assembly as defined in claim 9, in which said valve body portion has a free end defining a substantially flat transverse bearing surface and said biasing member comprises a thin plate having a surface in contact with said bearing surface.

11. An aerosol valve assembly as defined in claim 9, in which said support means comprises means defining a transverse ledge surrounding said fluid intake passage, and said biasing member comprises a triangular flat plate supported on said ledge and portions of the sides of said plate spaced from said ledge to provide said flow communication.

12. An aerosol valve assembly as defined in claim 9, in which said biasing member comprises a sheet form member having surface contact with a surface on said valve member portion.

13. An aerosol valve assembly as defined in claim 9, in which said biasing member comprises a polygonal plate supported on said support means, and symmetrically disposed relative to the axis of said valve member.

14. An aerosol valve assembly as defined in claim 9, in which said body has a bottom wall with said inlet passage in said bottom wall, the further improvement of ribs defined thereon, said ribs being disposed in the path of said planar biasing member to prevent excessive displacement of said planar biasing member.

15 An aerosol valve assembly as defined in claim 9, in which said biasing member has an impervious portion disposed in alignment with said intake passage and has multipoint contact with said support means.